United States Patent [19]

Karmin

[11] 4,345,540
[45] Aug. 24, 1982

[54] TAPE CASSETTE

[76] Inventor: Irving Karmin, 32-22 92 St., Queens, N.Y. 11369

[21] Appl. No.: 200,521

[22] Filed: Oct. 24, 1980

Related U.S. Application Data

[63] Continuation of Ser. No. 689, Jan. 3, 1979, abandoned.

[51] Int. Cl.³ .................. G09F 9/00; G11B 23/42
[52] U.S. Cl. ............................ 116/278; 116/298; 360/137
[58] Field of Search ............... 116/278, 318, 67 A, 116/200, 284; 360/134, 137

[56] References Cited

U.S. PATENT DOCUMENTS

| | | | |
|---|---|---|---|
| 2,593,351 | 4/1952 | Shannon | 116/278 X |
| 2,920,148 | 1/1960 | Munroe | 116/67 A |
| 2,940,417 | 6/1960 | Starck | 116/67 A |
| 3,802,106 | 4/1974 | Lippman | 116/67 A |
| 3,810,246 | 5/1974 | Stone, Jr. et al. | 242/57 X |
| 3,913,200 | 10/1975 | Kossor | 116/284 |
| 3,943,879 | 3/1976 | Stone, Jr. | 116/67 A |
| 4,072,995 | 2/1978 | Sato | 360/137 |
| 4,096,633 | 6/1978 | Nolan | 116/318 X |
| 4,099,480 | 7/1978 | Loustaunau | 116/284 |

Primary Examiner—Daniel M. Yasich
Attorney, Agent, or Firm—Irving Karmin

[57] ABSTRACT

An improved tape cassette containing markings on the edge of the tape which contrast with the color of the tape. When the tape edges form the tape reel face as the tape is wound on one hub of the cassette an easily seen pattern is formed. This pattern is readily visible even under poor conditions of visibility through the cassette window. During recorder/playback use the operator can quickly check to see if the tape is moving by noting the pattern movement when viewed in the window.

6 Claims, 3 Drawing Figures

TAPE CASSETTE

This is a Continuation of application Ser. No. 000,689, filed Jan. 3, 1979 now abandoned.

BACKGROUND OF THE INVENTION

This invention relates generally to tape cassettes and the like. In particular this invention presents an improved tape cassette wherein markings are affixed to the tape edge or tape reel face during manufacture of the loaded cassette.

Heretofore it has been difficult to determine when tape movement in a cassette occurs unless the diameter of the tape noticably changes. A noticable change in diameter requires approximately a dozen revolutions of the tape reel during which time, especially while recording, much information is lost.

Efforts to solve this problem have been made and are known in the art. These efforts primarily result in attaching turn indicators to recorder drive mechanisms and are relatively expensive compared to my invention.

A search of U.S. Patent Office records show certain prior art patents which while are anticipatory of the present invention, disclose representative examples of previous or known efforts to solve some of the problems associated with the art embodying this invention.

U.S. Pat. Nos. 3,943,879 and 3,810,246 to Stone And Beaumont show a system of tape marking which concerns itself with locating preselected portions of a prerecorded tape.

While I do not wish to minimize the inventiveness and efforts of the invention associated with the aforesaid prior patents, and while these people may be attempting to solve a problem that is similar to some of the problems solved by the present invention, it is worth mentioning some of the drawbacks of these inventions such that the size and diversity of markings renders it difficult to detect the marked portions of the tape without stopping the tape. Further, when stopped the tape markings will tend to blend with the general tape color and not be readily visible.

SUMMARY OF THE INVENTION

Accordingly it is an object of the present invention to provide a method of marking the cassette tape with a pattern of contrasting color;

Another object of the invention is to provide easy visibility to the irregularity or cessation of movement of tape within the cassette;

Yet another object of this invention is to permit part of a reel turn to be visible;

A further object of this invention is to provide the purchaser of fresh tape the opportunity of verifying that the tape was not used previously;

Still another object of this invention is to provide a quick way for the user of a recorded cassette to know which way it is wound;

Still yet another object of this invention is to provide for a highly visible method to determine if the cassette has been rewound;

A still further object of this invention is to provide an indication of a tape recorder's rewind mechanism functioning.

BRIEF DESCRIPTION OF THE DRAWINGS

My invention will be made more clearly understood from the following description of specific embodiments of the invention, together with the accompanying drawings, in which.

DETAILED DESCRIPTION OF THE PREFERRED EMBODIMENT

Figure 1:
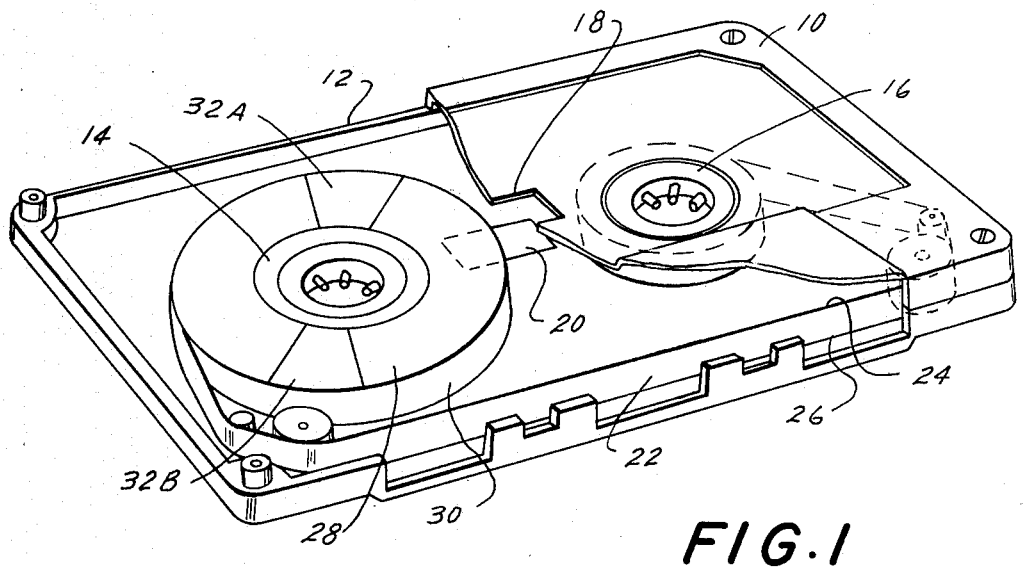
FIG. 1 is a partially sectioned perspective view of a tape cassette.

Referring now to the drawings and more particularly to FIG. 1 thereof, there is depicted the new and novel improved tape cassette which is constructed in accordance with the principles of the present invention. The improved tape cassette comprises a top portion 10 made integral with a bottom portion 12. Contained within the improved tape cassette is a first tape hub 14 and a second tape hub 16. Top portion 10 has integral a first tape window 18. Similarly, bottom portion 12 has integral a second tape window 20. Located within the improved tape cassette is a tape 22 having a first tape edge 24 and a second tape edge 26. A tape reel face 28 formed from the tape edges which is part of tape reel 30 can be observed through first window 18. Tape reel 30 is formed by winding the greater bulk of tape 22 onto first tape hub 14 after affixing one end of tape 22 thereto. The other end of tape 22 is affixed to second tape hub 16. Integral with tape reel face 28 is a marking 32A and a marking 32B.

Figure 2A:
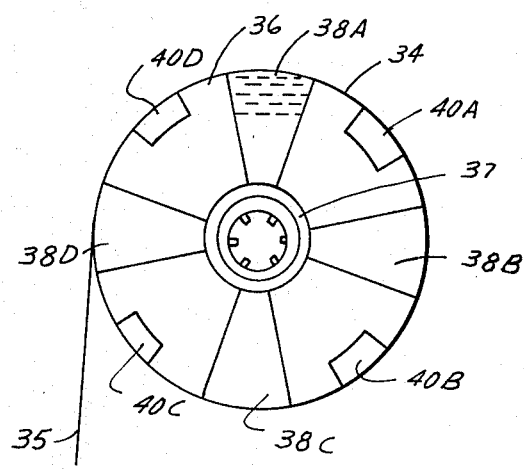
FIG. 2A is a loaded reel with pattern before use.

FIG. 2A shows a full tape reel 34 formed by winding a tape 35 so as to form a tape reel face 36 formed from the tape edges. One end of tape 35 is affixed to a tape hub 37 which is used to form tape reel 34. Integral with tape reel face 36 is a predetermined pattern of contrasting color. The complete pattern comprises a block marking set 38A, B, C, D, with adjacent markings of the set being approximately 90° apart and a truncated block marking set 40A, B, C, D, with adjacent markings of the set being approximately 90° apart. Marking 38A is approximately 45° from marking 40A as are respective parts of each set.

Figure 2B:
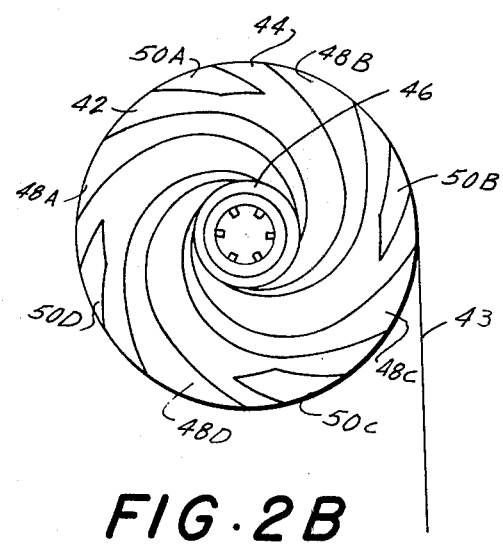
FIG. 2B is a loaded reel with pattern after tape transfer.

FIG. 2B shows a tape reel face 42 formed when a tape 43 is transferred onto a tape reel 44. Tape 43 which is a continuation of the tape 35 is affixed to and wound on a tape hub 46 to form tape reel 44 formed of the tape edges. Integral with tape reel face 42 is a pattern of contrasting color comprising markings 48A, B, C, D and markings 50A, B, C, D. With the periphery of tape reel 44 as reference, markings 48A, B, C, and D are each approximately 90° from other adjacent markings in its set. Similarly, markings 50A, B, C, and D are each approximately 90° from adjacent markings in its set. Further marking 48A is approximately 45° from marking 50A as are respective parts of each set.

In operation the improved tape cassette is inserted into a conventional player/recorder machine and the operator commences to record or playback. As the machine causes second tape hub 16 to rotate tape 22 is wound onto second tape hub 16. The movement of tape 22 causes tape to be removed from tape reel 30. As tape reel 30 rotates markings 32A and 32B pass under first window 18. The contrasting color of markings 32A and 32B are easily visible as they pass first window 18. Although the operator cannot discern the shape of the markings he can easily see the alternating pattern of contrasting color. With the markings 32A and 32B shown each one quarter turn of the tape reel 30 is seen and gives the operator rapid warning of tape transport irregularities. If tape reel 30 stops the clarity of the stationary pattern is immediately evident to the operator who then can take appropriate action.

Although the foregoing description of FIG. 1 shows marking 32A and 32B on tape reel face 28 formed of the tape edges it can be easily seen that tape reel 30 has another tape reel face consisting of second tape edge 26. This other tape reel face can also have a marking applied for reasons aforementioned. Further it may be desirable to wind tape 22 onto second tape hub 16 and form yet another tape reel face consisting of second tape edge 26. The resulting tape reel face formed of the tape edges is then marked with a pattern in the aforementioned manner so as to be visible in second window 20.

FIG. 2A shows how the markings on a preplayed cassette reel will appear. During manufacture of the improved tape cassette markings 38A, B, C, D and markings 40A, B, C, D are applied to tape reel face 36 formed of the tape edges after tape 35 has been loaded onto tape hub 37. The marking pattern shown is one embodiment of my invention and other patterns may be used. The marking pattern may be applied by a stencil carrying an ink or dye making contact with tape reel face 36. I have discovered that the pattern can be sprayed onto tape reel face 36 by airbrush means. The aforementioned does not preclude other marking techniques. Once the pattern of markings 38A, B, C, D and markings 40A, B, C, and D have been applied to tape reel face 36 formed of the tape edges tape hub 37 can be assembled into a cassette similar to that shown in FIG. 1. The marking pattern shown in FIG. 2A is the pattern to be seen in the tape window of a new cassette which has not been used by anyone after being assembled. It can readily be seen that the cassette may be unrecorded or prerecorded with the same operating results.

FIG. 2B shows a pattern resulting when the tape which previously displayed a pattern shown in FIG. 2A has passed through the machine and is fully loaded onto tape hub 46, where tape hub 46 is similar in function to second tape hub 16. The resulting marking pattern consisting of markings 48A, B, C, D and markings 50A, B, C, D are spiral shaped. The spiral shape is due to the slippage between adjacent layers of tape as winding tensions vary in the player/reproducer. Different machines will yield different spiral patterns. Further the resulting spiral pattern can be used as an index of a machine's proper operation.

Further it is contemplated that this invention may be used with other forms of recording tape stored in cartridges as well as applied to open reel recorders.

The embodiment of the invention particularly disclosed and described herein above is presented merely as an example of the invention. Other embodiments, forms, and modifications of the invention coming within the proper scope and spirit of the appended claims, will of course, readily suggest themselves to those skilled in the art.

What is claimed is:

1. An improved tape cartridge, comprising:
    a generally rectangular housing, viewing means, rotatable hub means mounted within said housing and recordable tape wound on said hub means to form a tape reel face consisting of a plurality of contiguous tape edges;
    marking means applied to said plurality of contiguous tape edges before a first unwinding of said recordable tape, said marking means forming;
    a first pattern, marked on said tape edges, each pattern of said marking means spaced substantially 90° apart on subsequent rewinding forms;
    a second pattern, said first and second pattern causing alternating portions of said marking means and said tape to appear whereby rotational movement of said marking means indicated movement of said tape as seen by viewing means.

2. The tape cartridge of claim 1 wherein said marking means is a predetermined marking formed substantially in block form.

3. The tape cartridge of claim 1 or 2 wherein said marking means is of a color other than the color of said tape edges.

4. The tape cartridge of claim 1 or 3 wherein said viewing means is a window in said rectangular housing.

5. The tape cartridge of claim 3 wherein said rectangular housing is transparent and said viewing means is a portion of said rectangular housing.

6. A generally rectangular housing, viewing means, rotatable hub means mounted within said housing and recordable tape wound on said hub means to form a tape reel face consisting of a plurality of contiguous tape edges;
    marking means applied to said plurality of contiguous tape edges before a first unwinding of said recordable tape, said marking means forming;
    a first pattern consisting of a plurality of block markings forming a first set and a plurality of truncated block markings forming a second set, on subsequent rewinding forms;
    a second pattern, said first and second pattern causing alternating portions of said marking means and said tape to appear whereby rotational movements of said marking means indicates movement of said tape as seen by said viewing means.

* * * * *